(12) United States Patent
Tomlinson et al.

(10) Patent No.: US 8,977,848 B1
(45) Date of Patent: Mar. 10, 2015

(54) METHOD AND SYSTEM FOR RECONCILING SAFETY-CRITICAL AND HIGH ASSURANCE SECURITY FUNCTIONAL REQUIREMENTS BETWEEN SAFETY AND SECURITY DOMAINS

(75) Inventors: Brandon L. Tomlinson, Coralville, IA (US); Kevin R. Priest, Knoxville, IA (US); Branden H. Sletteland, Marion, IA (US); Michael J. Frerking, Marion, IA (US); Cheryl L. Killham, Marion, IA (US); Brian S. Cain, Cedar Rapids, IA (US); Jeffrey B. McNamara, Marion, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 528 days.

(21) Appl. No.: 13/296,845

(22) Filed: Nov. 15, 2011

(51) Int. Cl.
*H04L 29/06* (2006.01)
*G06F 9/50* (2006.01)
*G06F 21/57* (2013.01)
*G06F 21/71* (2013.01)

(52) U.S. Cl.
CPC ............... *G06F 21/57* (2013.01); *G06F 21/71* (2013.01); *G06F 9/5061* (2013.01); *G06F 2221/2149* (2013.01)
USPC .......................................... 713/166; 719/319

(58) Field of Classification Search
CPC . G06F 21/57; G06F 21/71; G06F 2221/2101; G06F 2221/2105; G06F 2221/2113; G06F 2221/2149; G06F 9/50; G06F 9/5061; G06F 9/5077
USPC ................ 713/166, 164; 718/107, 106, 104; 701/3, 14; 712/28, 29; 719/319
See application file for complete search history.

(56) References Cited

U.S. PATENT DOCUMENTS

| | | | |
|---|---|---|---|
| 6,119,236 A * | 9/2000 | Shipley | 726/22 |
| 7,415,331 B2 * | 8/2008 | Dapp et al. | 701/25 |
| 7,430,520 B1 * | 9/2008 | Haugen et al. | 705/14.26 |
| 7,474,618 B2 * | 1/2009 | Beckwith et al. | 370/232 |

(Continued)

OTHER PUBLICATIONS

Parkinson et al. "Safety-Critical Software Development for Integrated Modular Avionics", Wind River white paper. 2007 (10 pgs).*

*Primary Examiner* — Zachary A Davis
(74) *Attorney, Agent, or Firm* — Angel N. Gerdzhikov; Donna P. Suchy; Daniel M. Barbieri

(57) ABSTRACT

Systems and methods for providing safety and security functions are disclosed. The system includes a computing device that provides at least a first partition and a second partition. The computing device implements time and space partitioning to isolate resources available to the first partition and the second partition. The system also includes a safety module that operates in the first partition for providing safety functions for the system. The system further includes a security module that operates in the second partition for providing security functions for the system. A predefined communication interface is utilized to facilitate communications between the safety module and the security module. The communication interface defines a set of communications allowable between the safety module and the security module, wherein information sharing between the safety module and the security module is restricted to only the set of communications allowed through the communication interface.

20 Claims, 3 Drawing Sheets

(56) References Cited

U.S. PATENT DOCUMENTS

| | | | |
|---|---|---|---|
| 7,558,966 B2 * | 7/2009 | Durham et al. | 713/187 |
| 7,987,385 B2 * | 7/2011 | Pruiett et al. | 714/11 |
| 8,458,718 B2 * | 6/2013 | Hotra et al. | 718/104 |
| 2007/0050755 A1 * | 3/2007 | Mizrachi et al. | 717/116 |

* cited by examiner

METHOD AND SYSTEM FOR RECONCILING SAFETY-CRITICAL AND HIGH ASSURANCE SECURITY FUNCTIONAL REQUIREMENTS BETWEEN SAFETY AND SECURITY DOMAINS

TECHNICAL FIELD

The present disclosure relates generally to safety and security systems and more particularly to methods and systems for reconciling safety-critical and high assurance security functional requirements between safety and security domains.

BACKGROUND

A safety-critical system is a system whose failure or malfunction may result in death or serious injury to people, loss or severe damage to equipment, environmental harm, or other similar catastrophic event. For example, an aircraft control system is considered a safety-critical system since the failure of the system may result in the loss of human life and the aircraft. Various standards, such as the Radio Technical Committee on Aeronautics (RTCA) guidance document DO-178B, entitled "Software Considerations in Airborne Systems and Equipment Certification", focus on the safety of software used in airborne systems. Other documents, such as DO-254, entitled "design assurance guidance for airborne electronic hardware", provide guidance for the development of airborne electronic hardware.

In addition to satisfying the safety requirements, airborne systems also need to provide certain security functions. For example, Multi-Level Security (MLS) or Multiple Independent Levels of Security (MILS) functions allow a computer system to process information with different sensitivities (i.e., at different security levels), permit simultaneous access by users with different security clearances and needs-to-know, and prevent users from obtaining access to information for which they lack authorization. The Evaluation Assurance Level (EAL 1 through EAL 7) of a computer system is a numerical grade assigned following the completion of a Common Criteria security evaluation. The intent of the higher levels is to provide higher confidence that the system's principal security features are reliably implemented.

Previously, physically separate federated systems have been used to handle the safety and security functions. However, due to platform size, weight, and power (SWAP) constraints, new systems may be required to simultaneously perform flight critical safety functions and high robustness MLS/MILS functions. In such systems, however, reconciling the allocation of operational requirements between the safety and security domains can be difficult. Therein lies a need for a method and system for reconciling safety-critical and high assurance security functional requirements between safety and security domains.

SUMMARY

The present disclosure is directed to a system for providing both safety and security functions. The system includes a computing device that provides at least a first partition and a second partition. The computing device implements time and space partitioning to isolate resources available to the first partition and the second partition. The system also includes a safety module that operates in the first partition. The safety module provides safety functions for the system. The system further includes a security module that operates in the second partition. The security module provides security functions for the system. A predefined communication interface is utilized to facilitate communications between the safety module and the security module. The communication interface defines a set of communications allowable between the safety module and the security module, wherein information sharing between the safety module and the security module is restricted to only the set of communications allowed through the communication interface.

A further embodiment of the present disclosure is directed to a method for reconciling safety and security functions in an integrated computing device. The method may include partitioning the computing device to provide at least a first partition and a second partition; isolating resources available to the first partition and the second partition utilizing time and space partitioning; providing a safety module in the first partition for performing safety functions; providing a security module in the second partition performing security functions; and providing a predefined communication interface between the safety module and the security module, the predefined communication interface defining a set of communications allowable between the safety module and the security module, wherein information sharing between the safety module and the security module is restricted to only the set of communications allowed through the predefined communication interface.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a method and system for reconciling safety-critical and high assurance security functional requirements between safety and security domains. In one embodiment, a physical system is logically separated to provide both safety functions (e.g., utilizing a safety module) and security functions (e.g., utilizing a security module). Resource isolation is established between the safety module and the security module, wherein the safety module and the security module are only allowed to communicate through a predefined communication interface (e.g., an Application Programming Interface, or API). Such a configuration reconciles safety-critical and high assurance security functional requirements. In addition, the resource isolation between the safety module and the security module allows the modules to be certified independently with respect to each other, minimizing the costs associated with such certifications.

Figure 1:
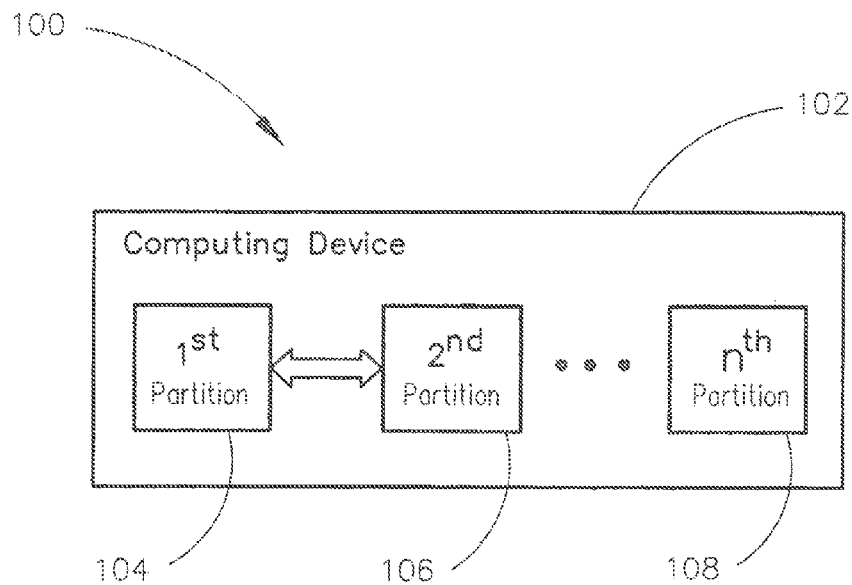
FIG. 1 is a block diagram illustrating a system configured for providing both safety and security functions.

Referring to FIG. 1, a block diagram depicting a system 100 that provides both safety and security functions is shown. In one embodiment, the system 100 may include a computing device 102 configured for supporting time and space partitioning. For example, the computing device 102 may be a computer that supports a Separation Kernel Operating System (SKOS). A separation kernel is a type of kernel used to simulate a distributed environment. This allows the computing device 102 to provide two or more partitions (e.g., partitions 104, 106, and 108 in FIG. 1), wherein the resources available to these partitions are isolated using time and space partitioning.

One of these partitions, a first partition 104 indicated in FIG. 1 for illustrative purposes, is utilized to implement the safety module (may also be referred to as health monitor). The safety module provides the required safety functions for the system 100. Another partition, a second partition 106 indicated in FIG. 1 for illustrative purposes, is utilized to implement the security module (may also be referred to as audit). The security module provides the required security/audit functions for the system 100. It is noted that since the resources available to the first partition 104 and the second partition 106 are isolated, the safety module and the security module therefore operate in their own partitions and behave as separate subsystems. This allows modules/applications that need to be certified at different safety/security classification levels to operate on the same physical device (e.g., processor).

It is contemplated that necessary interactions between the safety module and the security module may need to be provided in order to meet certain functional requirements. In one embodiment, a predefined communication interface (e.g., an Application Programming Interface, or API) is utilized to define a set of communications allowed between the safety module and the security module. Information sharing between the safety module and the security module is restricted to only the set of communications allowed through the communication interface. In this manner, the communication interface minimizes the amount of information shared between the safety and security modules while maintaining the ability of the system to meet operational requirements of both safety and security domains. In addition, this configuration reconciles the allocation of common functional requirements to minimize duplication of functions in the system.

As mentioned above, the system 100 in accordance with the present disclosure allows the safety and security modules to be certified at different safety/security classification levels. For instance, for an airborne system, the DO-178B level of the safety module may need to be certified to Level A, but a Level C certification may suffice for the security module. Similarly, the Evaluation Assurance Level of the security module may need to be certified to EAL 6, but an EAL 4 certification may suffice for the safety module. By allowing the safety and security modules to be certified at different safety/security classification levels (instead of requiring the entire system 100 to be certified to Level A, EAL 6), system 100 in accordance with the present disclosure minimizes costs, development time and resources needed for such certifications.

It is understood that the specific references to the safety/security classification levels above are merely exemplary. Different modules in the same system may be certified to different levels without departing from the spirit and scope of the present disclosure.

It is contemplated that each of the safety module and the security module may be responsible for providing certain required functions. For instance, the safety module provides the required safety functions for the system 100. Therefore, it is responsible for monitoring and reporting hardware, SKOS, and software application faults and failures. For example, the safety module may maintain the safety criticality of the system by performing Periodic Built-in-Test (BIT) of all firmware, software, and hardware on the processor card. The safety module may also monitor for conditions to initiate system shutdown, reset or restart. Other responsibilities of the safety module may include, but are not limited to, performing validity checks to ensure the correct application software is installed and has not been corrupted; providing services for applications and system software within other partitions to log faults to nonvolatile memory; collecting life cycle data, including a power-on cycle counter and an operational time counter; and transmitting summary fault information periodically (e.g., on a local area network).

Similarly, the security module provides the required security functions for the system 100. It is therefore responsible for performing management of the security relevant functions on or within the system. For example, the security module may monitor and log all security related events within the system. The security module may also monitor in real-time occurrences of, or an accumulation of, system events that may indicate an imminent violation of the system's security policies, including activities that might modify, bypass, or negate safeguards controlled by the system. Furthermore, the security module may take actions against security-related components of the system if any unusual or inappropriate activities are detected, with a user-configurable capability to disable the system if serious violations are detected.

In accordance with the present disclosure, for a system that handles both safety-critical functions and high assurance security, the safety module may be responsible for handling all non-security-related functions while the security module may be responsible for handling only security-related functions. That is, the security module may rely on the safety module (through the communication interface) to provide certain capabilities in order to avoid duplication of functions within the system. Such functions may include, for example, taking corrective actions, health monitor auditing, operating system (e.g., SKOS) auditing, secure initial state (SIS) and the like.

Figure 2:
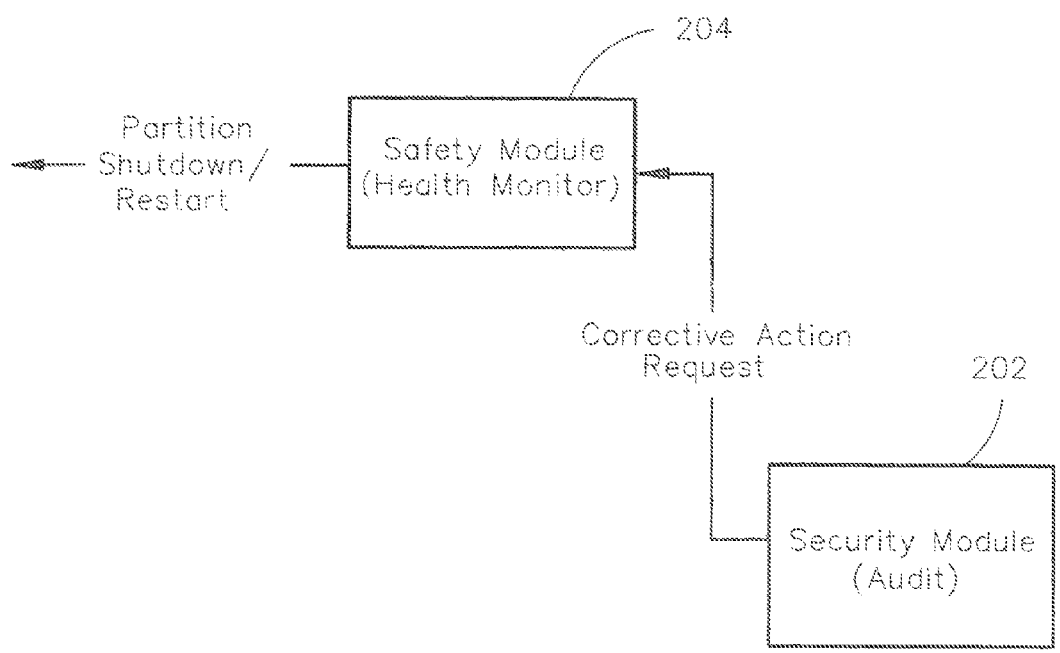
FIGS. 2-5 are block diagrams illustrating an exemplary communication interface defining a set of communications allowable between the safety module and the security module in accordance with the present disclosure.

For instance, corrective actions may be taken when it is determined that the safety criticality or security assurance of the system is threatened. Referring to FIG. 2, as part of its security monitoring and policy enforcement functions, the security module 202 may monitor/audit the incoming events to determine if a security violation has occurred. If a security violation is detected, corrective actions (e.g., shutdown and restart) must be taken against the offending system components. To perform such corrective actions, the security module 202 may notify the safety module 204 of the set of security-relevant partitions that need to be shutdown and restarted. The safety module 204 may then perform the shutdown and the subsequent restart of those security relevant partitions. In some cases, the security module 202 may request that the security module 202 be included in the set of partitions requiring a shutdown/restart. In such cases, the safety module 204 must ensure that the partition in which the security module 202 operates within is the last partition to be shutdown and the first partition to be restarted in order to provide necessary oversight of the corrective action taken against the other security components in the system.

It is contemplated that the safety module 204, as part of its configuration data (e.g., read in at runtime), may maintain a list of partitions over which the security module 202 has the authority to command a shutdown and restart. If the configuration data of the safety module 204 does not specify that the security module 202 has authority to command a shutdown/restart for a particular partition, the safety module 204 may ignore the shutdown/restart request for that particular partition in order to prevent the security module 202 from interfering with any non-security-related functions within the system. Furthermore, by configuring the safety module 204 with such an "allowed" set of partitions that the security module 202 can request shutdown for, it allows an integrator to prioritize safety or security for the system.

Figure 3:
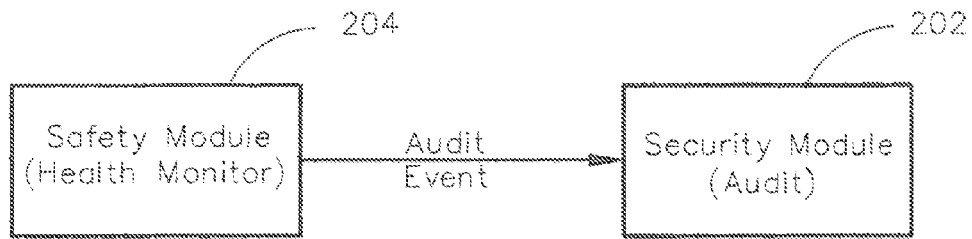

In addition to handling shutdown/restart commands requested by the security module 202, the safety module 204 may also report to the security module 202 certain security-related application and system events, as illustrated in FIG. 3. Such security-related events may include test failures, partition startup, partition shutdown and the like. In this manner, the safety module 204 keeps the security module 202 abreast of events that are commonly logged by the safety module 204 as safety-related maintenance events but are also required to be recorded/logged in the security module 202.

Figure 4:
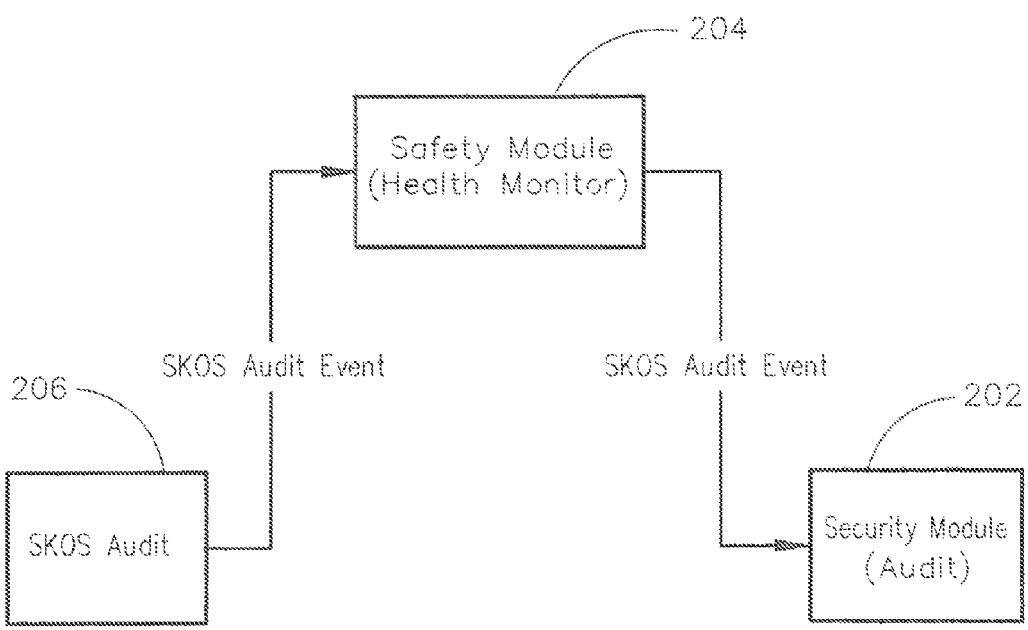

Furthermore, the safety module 204 may help the security module 202 to audit the underlying operating system that both safety and security modules operate within. In the example shown in FIG. 4, if a SKOS is utilized, the SKOS may perform its own security auditing of events (e.g., indicated as SKOS audit 206) within the SKOS layer. The API already required for the safety module 204 to communicate with the SKOS audit 206 can be utilized to issue corrective action commands and read Power On Self Test (POST) results. The safety module 204 may retrieve the audit events from the SKOS audit 206 and forward them to the security module 202 for evaluation and addition to the security module log.

For example, in cases where the SKOS halts a particular partition and logs an event, the safety module 204 may parse the SKOS audit log and send an audit event to the security module 202 to indicate that a partition has been halted along with the identifier of that particular partition. The security module 202 may then make a corrective action decision as to whether or not that partition should be restarted, or if other partitions must also be restarted. It is contemplated that the safety module 204 may also retain a copy of the audit event within its own maintenance log if it is deemed to be safety-related.

Figure 5:
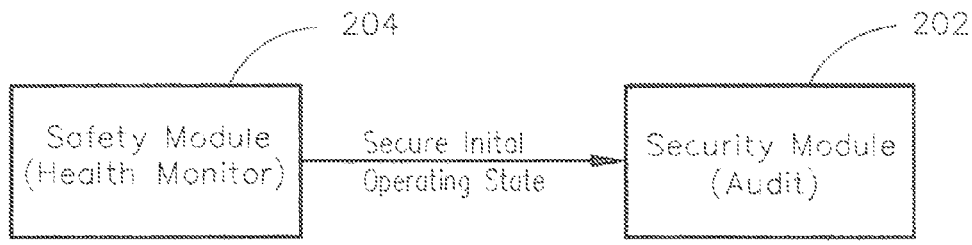

In addition, in systems that perform high assurance security functions, the safety module 204 may also help the security module 202 to verify whether a Secure Initial State (SIS) has been achieved before performing security enforcing functions, as illustrated in FIG. 5. For example, at startup, the safety module 204 may read in Power On Self Test (POST) data to verify whether the system hardware and SKOS are functioning properly. If the system hardware and SKOS are functional and the safety module 204 is configured to manage the safety aspects of the system, the safety module 204 may send a notification to the security module 202 to indicate that the system hardware, SKOS, and the safety module 204 have all achieved a secure initial operating state. Once the security module 202 has received this notification and its security policy is configured, it can claim that a Secure Initial State has been achieved. This approach eliminates the need for the security module 202 to separately check hardware status and/or POST results.

It is understood that while the examples above referenced a Separation Kernel Operating System (SKOS), such types of operating systems are merely exemplary. Other types of operating systems and/or computing devices that support time and space partitioning or resource isolation may also be utilized without departing from the spirit and scope of the present disclosure.

The system in accordance with the present disclosure minimizes the need for the safety module and the security module to access the same system components and data elements. That is, the system does not require duplicate functionality to meet the functional requirements that are similar between safety and security domains. In addition, the system minimizes the need to share information between security and safety domains, and allows security and safety functions to be carried out utilizing the same physical device. Furthermore, the system in accordance with the present disclosure does not require top level of safety and security certification for the entire system. Instead, each module may be certified independently, therefore, minimizing costs associated with certifications.

Figure 6:
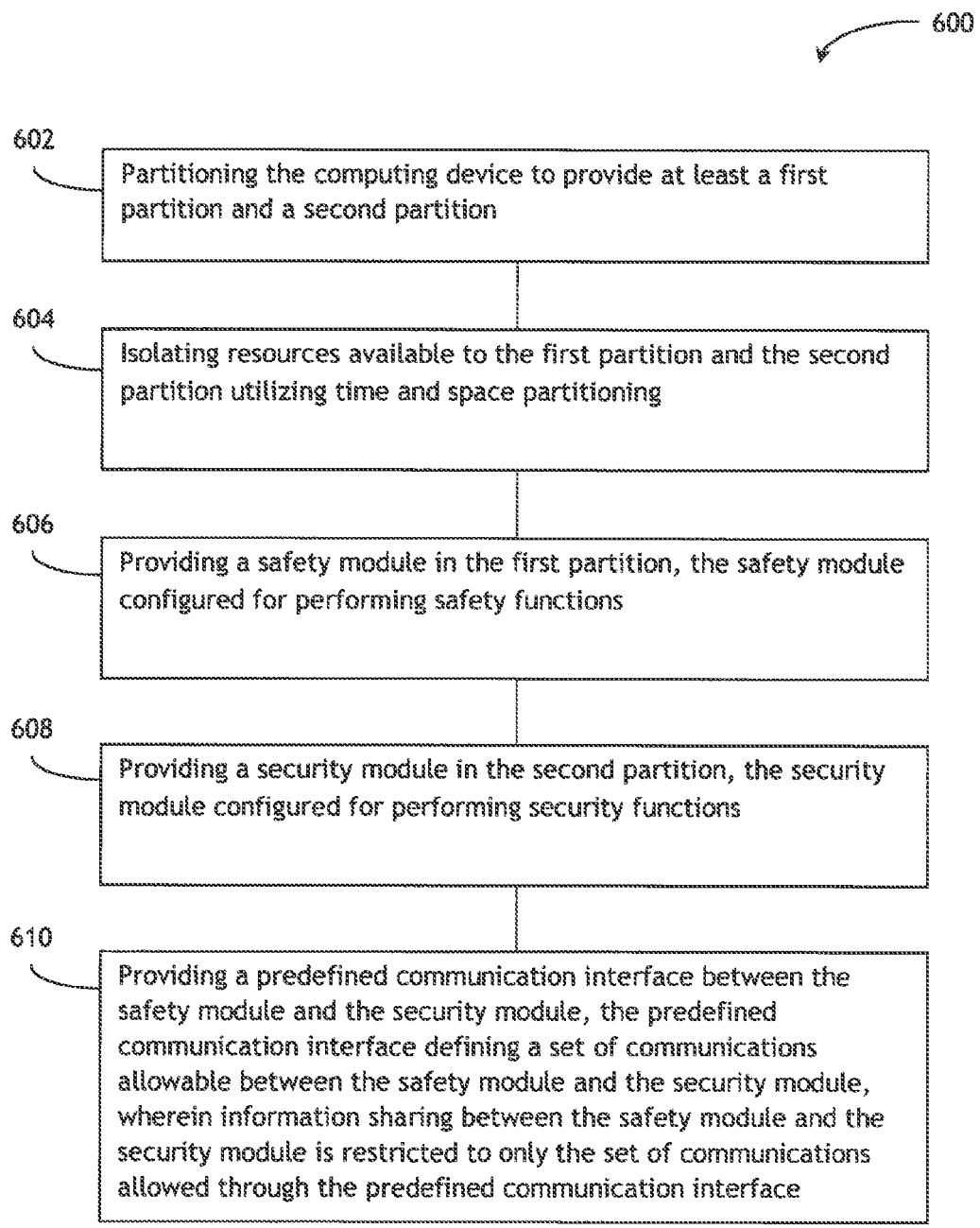
FIG. 6 is a flow diagram illustrating a method for reconciling safety and security functions in an integrated computing device.

Referring to FIG. 6, a flow diagram illustrating steps performed by a method 600 for reconciling safety and security functions in an integrated computing device is shown. Step 602 partitions the computing device in order to provide two or more partitions. As previously mentioned, resources (e.g., processing cycles, cache/memory/storage allocations and the like) available to these partitions may be isolated utilizing time and space partitioning techniques in step 604. Step 606 provides a safety module in a first partition to carry out the safety-related functions as described above. Similarly, step 608 provides a security module in a second (different) partition to carry out the security-related functions as described above.

Step 610 provides a communication interface between the safety module and the security module. The communication interface may define a set of communications allowed between the safety module and the security module. Information sharing between the safety module and the security module is restricted to only the set of communications allowed through the communication interface. In this manner, the communication interface minimizes the amount of information shared between the safety and security modules while maintaining the ability of the system to meet operational requirements of both safety and security domains. In addition, this configuration reconciles the allocation of common functional requirements to minimize duplication of functions in the system.

It is to be understood that the present disclosure may be conveniently implemented in the form of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A system for providing both safety and security functions, the system comprising:
   a computing device providing at least a first partition and a second partition, the computing device implementing time and space partitioning to isolate resources available to the first partition and the second partition;
   a safety module operating in the first partition, the safety module providing safety functions for the system;
   a security module operating in the second partition, the security module providing security functions for the system; and
   a predefined communication interface defining a set of communications allowable between the safety module and the security module, wherein information sharing between the safety module and the security module is restricted to only the set of communications allowable through the predefined communication interface,
   wherein the security functions provided by the security module include detecting a security violation, and wherein the set of communications allowable between the safety module and the security module includes a corrective action request from the security module to the safety module specifying a set of security-relevant partitions to be shutdown and restarted when the security violation is detected.

2. The system of claim 1, wherein when the set of security-relevant partitions to be shutdown and restarted includes the second partition within which the security module operates, the second partition is the last partition the safety module shuts down and the first partition the safety module restarts.

3. The system of claim 1, wherein for each particular partition of the set of security-relevant partitions specified in the corrective action request, the safety module determines whether the security module is authorized to request a shutdown and restart for that particular partition, and performs the shutdown and restart for that particular partition only when the security module is authorized.

4. The system of claim 1, wherein the set of communications allowable between the safety module and the security module includes an event report from the safety module to the security module, wherein the event report notifies the security module of a security-related event.

5. The system of claim 1, wherein the set of communications allowable between the safety module and the security module includes an audit report from the safety module to the security module, wherein the audit report is retrieved by the safety module from an operating system within which both the safety module and the security module operate.

6. The system of claim 1, wherein the set of communications allowable between the safety module and the security module includes a Secure Initial State (SIS) notification from the safety module to the security module.

7. The system of claim 1, wherein the computing device utilizes a Separation Kernel Operating System (SKOS) to implement time and space partitioning.

8. A method for reconciling safety and security functions in an integrated computing device, the method comprising:
   partitioning the computing device to provide at least a first partition and a second partition;
   isolating resources available to the first partition and the second partition utilizing time and space partitioning;
   providing a safety module in the first partition, the safety module configured for performing safety functions;
   providing a security module in the second partition, the security module configured for performing security functions, wherein the security functions include detecting a security violation; and
   providing a predefined communication interface between the safety module and the security module, the predefined communication interface defining a set of communications allowable between the safety module and the security module, wherein information sharing between the safety module and the security module is restricted to only the set of communications allowable through the predefined communication interface, and wherein the set of communications allowable between the safety module and the security module includes a corrective action request from the security module to the safety module specifying a set of security-relevant partitions to be shutdown and restarted when the security violation is detected.

9. The method of claim 8, wherein when the set of security-relevant partitions to be shutdown and restarted includes the second partition within which the security module operates, the second partition is the last partition the safety module shuts down and the first partition the safety module restarts.

10. The method of claim 8, wherein for each particular partition of the set of security-relevant partitions specified in the corrective action request, the safety module determines whether the security module is authorized to request a shutdown and restart for that particular partition, and performs the shutdown and restart for that particular partition only when the security module is authorized.

11. The method of claim 8, wherein the set of communications allowable between the safety module and the security module includes an event report from the safety module to the security module, wherein the event report notifies the security module of a security-related event.

12. The method of claim 8, wherein the set of communications allowable between the safety module and the security module includes an audit report from the safety module to the security module, wherein the audit report is retrieved by the safety module from an operating system within which both the safety module and the security module operate.

13. The method of claim 8, wherein the set of communications allowable between the safety module and the security module includes a Secure Initial State (SIS) notification from the safety module to the security module.

14. The method of claim 8, wherein the computing device utilizes a Separation Kernel Operating System (SKOS) to implement time and space partitioning.

15. A system for providing both safety and security functions, the system comprising:
   a computing device providing at least a first partition and a second partition, the computing device implementing time and space partitioning to isolate resources available to the first partition and the second partition;

a safety module operating in the first partition, the safety module providing safety functions for the system;

a security module operating in the second partition, the security module providing security functions for the system; and a predefined communication interface defining a set of communications allowable between the safety module and the security module, wherein the security functions provided by the security module include detecting a security violation, wherein the set of communications allowable between the safety module and the security module includes a corrective action request from the security module to the safety module specifying a set of security-relevant partitions to be shutdown and restarted when the security violation is detected, and wherein the safety module and the security module operate independently within the computing device and information sharing between the safety module and the security module is restricted to only the set of communications allowable through the predefined communication interface, allowing the safety module and the security module to be independently certifiable.

16. The system of claim 15, wherein the safety module and the security module are certifiable at different certification levels.

17. The system of claim 15, wherein when the set of security-relevant partitions to be shutdown and restarted includes the second partition within which the security module operates, the second partition is the last partition the safety module shuts down and the first partition the safety module restarts.

18. The system of claim 15, wherein the set of communications allowable between the safety module and the security module includes an event report from the safety module to the security module, wherein the event report notifies the security module of a security-related event.

19. The system of claim 15, wherein the set of communications allowable between the safety module and the security module includes an audit report from the safety module to the security module, wherein the audit report is retrieved by the safety module from an operating system within which both the safety module and the security module operate.

20. The system of claim 15, wherein the set of communications allowable between the safety module and the security module includes a Secure Initial State (SIS) notification from the safety module to the security module.

* * * * *